(12) United States Patent
Hong (10) Patent No.: US 11,226,491 B2
(45) Date of Patent: Jan. 18, 2022

(54) INTEGRATED IMAGING DISPLAY SYSTEM

(71) Applicant: BOE Technology Group Co., Ltd., Beijing (CN)

(72) Inventor: Tao Hong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 8 days.

(21) Appl. No.: 16/753,361

(22) PCT Filed: Mar. 21, 2019

(86) PCT No.: PCT/CN2019/078977
§ 371 (c)(1),
(2) Date: Apr. 3, 2020

(87) PCT Pub. No.: WO2020/186498
PCT Pub. Date: Sep. 24, 2020

(65) Prior Publication Data
US 2021/0215947 A1    Jul. 15, 2021

(51) Int. Cl.
*G02B 27/28* (2006.01)
*G02B 30/10* (2020.01)
(Continued)

(52) U.S. Cl.
CPC ............ *G02B 30/10* (2020.01); *G02B 27/283* (2013.01); *G02B 27/286* (2013.01); *H04N 13/307* (2018.05); *H04N 13/398* (2018.05)

(58) Field of Classification Search
USPC .......................................................... 348/58
See application file for complete search history.

(56) References Cited

U.S. PATENT DOCUMENTS 11,009,701 B2 * 5/2021 Hong .................. G02B 27/286
2009/0290079 A1  11/2009 Evans et al.
(Continued)

FOREIGN PATENT DOCUMENTS

CN         101432789 A      5/2009
CN         101952765 A      1/2011
(Continued)

OTHER PUBLICATIONS

International search report of PCT application No. PCT/CN2019/078977 dated Dec. 19, 2019.

*Primary Examiner* — Patricia I Young
(74) *Attorney, Agent, or Firm* — Fay Sharpe LLP (57) ABSTRACT

An integrated imaging display system is provided. The system includes: a display device, and a polarization converting element, an optical path folding element, and a micro-lens array provided on a light emitting side of the display device. The polarization converting element is configured to convert light emitted from the display device into first linearly polarized light in a first polarization state and second linearly polarized light in a second polarization state; and the micro-lens array is configured to form a first three-dimensional display image in a first depth-of-field range based on the first linearly polarized light and form a second three-dimensional display image in a second depth-of-field range based on the second linearly polarized light. Two depth-of-field ranges in the imaging space of the system may be formed, which enlarges the depth-of-field range of the imaging space.

18 Claims, 6 Drawing Sheets

(51) Int. Cl.
H04N 13/307 (2018.01)
H04N 13/398 (2018.01)

(56) References Cited

U.S. PATENT DOCUMENTS

| | | | | |
|---|---|---|---|---|
| 2011/0007392 | A1* | 1/2011 | English, Jr. ......... | G02B 27/145 |
| | | | | 359/489.08 |
| 2011/0164122 | A1* | 7/2011 | Hardacker ........... | H04N 13/327 |
| | | | | 348/53 |
| 2019/0204491 | A1 | 7/2019 | Hong | |
| 2019/0243147 | A1* | 8/2019 | Smithwick ............ | G02B 27/10 |
| 2020/0007857 | A1 | 1/2020 | Kasahara et al. | |

FOREIGN PATENT DOCUMENTS

| | | |
|---|---|---|
| CN | 106526875 A | 3/2017 |
| CN | 108181708 A | 6/2018 |
| CN | 109407315 A | 3/2019 |
| KR | 20140002847 A | 1/2014 |
| WO | WO2018168626 A1 | 9/2018 |

* cited by examiner

INTEGRATED IMAGING DISPLAY SYSTEM

This application is a 371 of PCT Patent Application No. PCT/CN2019/078977, filed Mar. 21, 2019, the entire contents of which are incorporated herein by reference.

TECHNICAL FIELD

The present disclosure relates to the field of display technology, and more particularly to an integrated imaging display system.

BACKGROUND

The integrated imaging display technology, as a naked-eye three-dimensional (3D) display technology, has become an important research topic in the field of 3D display due to the advantages of providing true 3D real-time stereo images with full parallax, continuous viewpoints and full colors, and overcoming visual fatigue.

SUMMARY

Embodiments of the present disclosure provides an integrated imaging display system.

In one aspect, an integrated imaging display system is provided. The integrated imaging display system includes a display device, and a polarization converting element, an optical path folding element, and a micro-lens array provided on a light emitting side of the display device, the polarization converting element, the optical path folding element, and the micro-lens array being sequentially disposed in a direction away from the display device;

the polarization converting element is configured to convert light emitted from the display device into first linearly polarized light in a first polarization state and second linearly polarized light in a second polarization state, the first polarization state being different from the second polarization state;

the optical path folding element is configured to transmit the first linearly polarized light to the micro-lens array according to a first transmission path and transmit the second linearly polarized light to the micro-lens array according to a second transmission path, the first transmission path having a greater length than the second transmission path; and the micro-lens array is configured to form a first three-dimensional display image in a first depth-of-field range based on the first linearly polarized light and form a second three-dimensional display image in a second depth-of-field range based on the second linearly polarized light, wherein a first distance between a central depth plane of the first depth-of-field range and a light emitting surface of the display device is shorter than a second distance between a central depth plane of the second depth-of-field range and the light emitting surface of the display device.

Optionally, the micro-lens array includes a plurality of micro-lenses, and the optical path folding element includes a plurality of optical path folding units corresponding to the micro-lenses one by one, an orthographic projection of the optical path folding unit on the light emitting surface coinciding with an orthographic projection of the corresponding micro-lens on the light emitting surface; and the optical path folding unit is configured to transmit the first linearly polarized light to the corresponding micro-lens according to the first transmission path and transmit the second linearly polarized light to the corresponding micro-lens according to the second transmission path.

Optionally, each of the optical path folding units includes a polarization light splitting element and two reflecting elements;

the two reflecting elements are oppositely disposed, and the polarization light splitting element is disposed between the two reflecting elements, two ends of the polarization light splitting element being respectively abutted against the two reflecting elements;

an included angle between a light splitting surface of the polarization light splitting element and a light incident surface of the corresponding micro-lens is an acute angle, and an included angle between the light splitting surface of the polarization light splitting element and a reflecting surface of each of the reflecting elements is an acute angle, the reflecting surface of each of the reflecting elements being intersected with a light emitting surface of the polarization converting element;

the polarization light splitting element is configured to transmit light in the first polarization state and reflect light in the second polarization state; and the reflecting element is configured to change a polarization state of incident light and reflect the light the polarization state of which is changed.

Optionally, each of the optical path folding units further includes a transparent rectangular parallelepiped structure, and an orthographic projection of the transparent rectangular parallelepiped structure on the micro-lens array coincides with a region where one micro-lens is located;

the two reflecting elements are two reflecting layers respectively disposed on two opposite surfaces of the transparent rectangular parallelepiped structure, one end of each of the reflecting layers close to the micro-lens being abutted against the light incident surface of the corresponding micro-lens, and another end of each of the reflecting layers close to the polarization converting element being abutted against the light emitting surface of the polarization converting element; and the polarization light splitting element is a polarization light splitting film that is located on a diagonal surface of the transparent rectangular parallelepiped structure, one end of the polarization light splitting film being abutted against one end of one of the reflecting layers, and another end of the polarization light splitting film being abutted against one end of the other of the reflecting layers.

Optionally, the transparent rectangular parallelepiped structure is composed of two triangular prism structures, and a rectangular surface where the two triangular prism structures are in contact is provided with the polarization light splitting film.

Optionally, the transparent rectangular parallelepiped structure is a transparent cubic structure, and the triangular prism structure is a right-angled triangular prism structure; and the reflecting surface of each of the reflecting elements is perpendicular to the light emitting surface of the polarization converting element.

Optionally, the transparent rectangular parallelepiped structure and the plurality of micro-lenses (1041) are made of glass, and the transparent rectangular parallelepiped structure in each of the optical path folding units is connected to the corresponding micro-lens by an optical cement.

Optionally, each of the reflecting layers includes a quarter-wave plate and a reflecting film that are stacked in a direction away from the polarization light splitting element.

Optionally, the plurality of optical path folding units are arranged in an array along a first direction, and two optical path folding units adjacent in the first direction share one reflecting film, the reflecting film being a double-sided reflecting film.

Optionally, the plurality of optical path folding units are arranged in an array along a first direction, and the reflecting films in two optical path folding units adjacent in the first direction are adjacent to each other.

Optionally, the polarization converting element is a polarization converting film, and an orthographic projection of the polarization converting film on the display device covers a display region of the display device;

one side of the polarization converting film is attached to the light emitting surface of the display device, and another side of the polarization converting film is attached to the light incident surface of the optical path folding unit.

Optionally, the integrated imaging display system further includes a system control element connected to the polarization converting element;

the system control element is configured to control the polarization converting element to convert the light emitted from the display device into the first linearly polarized light during a first period of each display cycle, and control the polarization converting element to convert the light emitted from the display device into the second linearly polarized light during a second period of each display cycle;

wherein a duration of each display cycle is greater than or equal to a duration of a refresh cycle of the display device.

Optionally, the duration of each display cycle is greater than the duration of the refresh cycle of the display device; and the display device is configured to display a first image during the first period and display a second image during the second period, the first image having a greater depth of field than the second image.

Optionally, the duration of each display cycle is less than 1/30 second.

Optionally, the display device includes a display panel and an image rendering element respectively connected to the display panel and the system control element;

the image rendering element is configured to render an image to be displayed under control of the system control element to generate image data, and transmit the image data to the display panel; and the display panel is configured to display an image based on the image data.

Optionally, the first polarization state is an S polarization state, the second polarization state is a P polarization state, and the polarization light splitting element is configured to reflect S-polarized light and transmit P-polarized light.

In another aspect, a control method for an integrated imaging display system is provided for controlling the integrated imaging display system according to the aforesaid aspect, and the method includes:

controlling the polarization converting element to convert the light emitted from the display device into first linearly polarized light in a first polarization state during a first period of each display cycle, and controlling the polarization converting element to convert the light emitted from the display device into second linearly polarized light in a second polarization state during a second period of each display cycle, the first polarization state being different from the second polarization state;

wherein a duration of each display cycle is greater than or equal to a duration of a refresh cycle of the display device.

Optionally, the duration of each display cycle is greater than the duration of the refresh cycle of the display device, and the method further includes:

controlling the display device to display a first image during the first period; and controlling the display device to display a second image during the second period, the first image having a greater depth of field than the second image.

Optionally, the method further includes:

controlling the display device to display a third image during the first period and the second period.

In still another aspect, a control device for an integrated imaging display system is provided for controlling the integrated imaging display system according to the aforesaid aspects, and the device includes:

a first control module, configured to control the polarization converting element to convert the light emitted from the display device into first linearly polarized light in a first polarization state during a first period of each display cycle.

The first control module is further configured to control the polarization converting element to convert the light emitted from the display device into second linearly polarized light in a second polarization state during a second period of each display cycle, the first polarization state being different from the second polarization state;

wherein a duration of each display cycle is greater than or equal to a duration of a refresh cycle of the display device.

Optionally, the duration of each display cycle is greater than the duration of the refresh cycle of the display device, and the device further includes:

a second control module, configured to control the display device to display a first image during the first period.

The second control module is further configured to control the display device to display a second image during the second period, the first image having a greater depth of field than the second image.

Optionally, the device further includes:

a third control module, configured to control the display device to display a third image during the first period and the second period.

In further another aspect, a system control element is provided for controlling the integrated imaging display system according to the aforesaid aspects, and the system control element includes: a memory and a processor; wherein the memory is configured to store a computer program; and the processor is configured to execute a program stored on the memory to implement the control method for the integrated imaging display system according to the aforesaid another aspect.

In still yet another aspect, a computer storage medium is provided. When the program in the storage medium is executed by the processor, the control method for the integrated imaging display system according to the aforesaid another aspect can be implemented.

DETAILED DESCRIPTION

Implementations of the present disclosure will be described in further detail with reference to the accompanying drawings, to present the objects, technical solutions, and advantages of the present disclosure more clearly.

Figure 1:
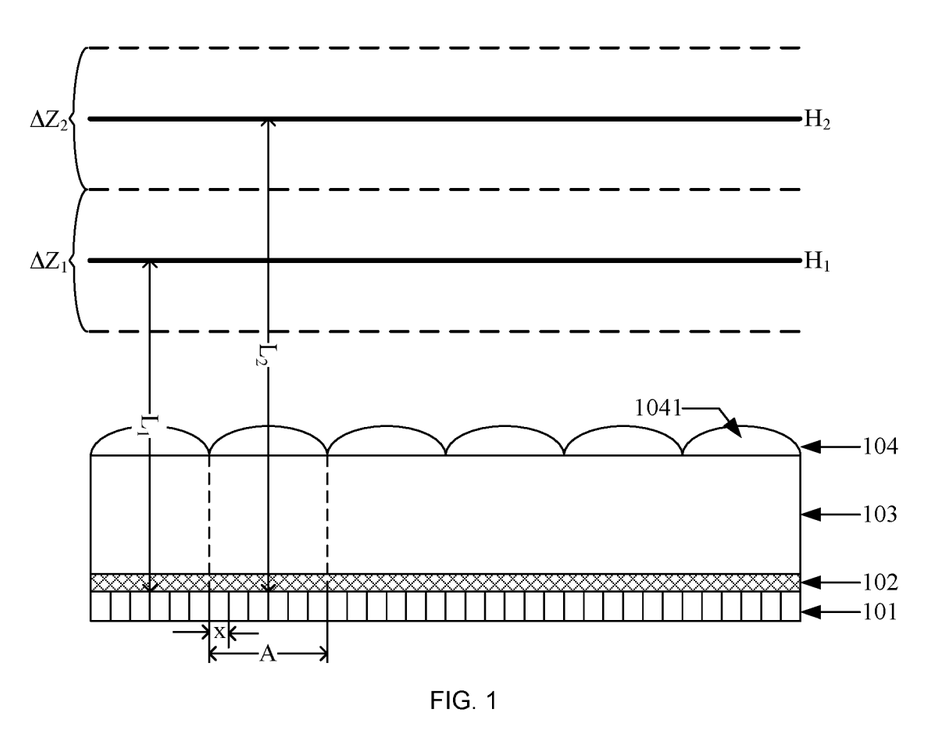
FIG. 1 is a schematic diagram of a structure of an integrated imaging display system according to an embodiment of the present disclosure.

FIG. 1 is a schematic diagram of a structure of an integrated imaging display system according to an embodiment of the present disclosure. As shown in FIG. 1, the integrated imaging display system includes a display device 101, and a polarization converting element 102, an optical path folding element 103, and a micro-lens array 104 provided on a light emitting side of the display device. The polarization converting element 102, the optical path folding element 103, and the micro-lens array 104 are sequentially disposed in a direction away from the display device 101. The display device 101 includes a display panel.

The polarization converting element 102 is configured to convert the light emitted from the display device 101 into first linearly polarized light in a first polarization state and second linearly polarized light in a second polarization state. The first the first polarization state is different from the second polarization state.

Optionally, the polarization converting element is configured to alternately convert light emitted from the display device into the first linearly polarized light in the first polarization state and the second linearly polarized light in the second polarization state.

Optionally, the first polarization state and the second polarization state may be one of an S polarization state and a P polarization state, respectively. The polarization converting element 102 may be of a film structure, such as a polarization converting film, and may be a wafer polarization converter, a liquid crystal polarization converter, or the like.

The optical path folding element 103 is configured to transmit the first linearly polarized light to the micro-lens array 104 according to a first transmission path and transmit the second linearly polarized light to the micro-lens array 104 according to a second transmission path, and the first transmission path has a greater length than the second transmission path.

The micro-lens array 104 is configured to form a first 3D display image in a first depth-of-field range $\Delta Z_1$ based on the first linearly polarized light, and form a second 3D display image in a second depth-of-field range $\Delta Z_2$ based on the second linearly polarized light.

A first distance $L_1$ between a central depth plane $H_1$ of the first depth-of-field range $\Delta Z_1$ and a light emitting surface of the display device 101 is shorter than a second distance $L_2$ between a central depth plane $H_2$ of the second depth-of-field range $\Delta Z_2$ and the light emitting surface of the display device 101.

Optionally, the micro-lens array 104 includes a plurality of micro-lenses 1041. The optical centers of the plurality of micro-lenses are located in the same plane that is parallel to the light emitting surface of the display device. Referring to FIG. 1, the orthographic projection of each micro-lens 1041 on the display device 101 covers one display sub-region A of the display device 101, and each display sub-region A has one or more pixels x. The display region of the display device includes a plurality of display sub-regions. For any one display sub-region, since the light with different pixels in the display sub-region is emitted at different positions from the corresponding micro-lenses, the light in all directions may be controlled by rendering the image and combining the refracting function of the micro-lenses, thereby forming the 3D display image in the depth-of-field range. The size of the depth-of-field range is an important display indicator of the integrated imaging display system, and thus used to indicate the size of the imaging space in which the integrated imaging display system can display a clear 3D display image.

It should be noted that since the length of the first transmission path of the first linearly polarized light in the optical path folding element is longer than the length of the second transmission path of the second linearly polarized light in the optical path folding element, the transmission distance of the light transmitted to the optical center of the micro-lens after emitted from the display panel and converted to the first linearly polarized light by the polarization converting element is greater than the transmission distance of the light transmitted to the optical center of the micro-lens after converted to the second linearly polarized light by the polarization converting element, which indicates that there are two different object distances. Whereas, the central depth plane of the depth-of-field range of the integrated imaging display system is the imaging surface of the micro-lens. When there are two different object distances, there are two different image distances accordingly, which indicates that there are two imaging surfaces. Thus, the imaging space of the integrated imaging system has two central depth planes, which namely includes two depth-of-field ranges.

In summary, in the integrated imaging display system according to the embodiment of the present disclosure, since the length of the first transmission path of the first linearly polarized light in the optical path folding element is longer than the length of the second transmission path of the second linearly polarized light in the optical path folding element, the distance from the image displayed on the display device to the optical center of the micro-lens when the image is transmitted by adopting the first linearly polarized light is greater than the distance from the image to the optical center of the micro-lens when the image is transmitted by adopting the second linearly polarized light, which indicates that there are two different object distances. Based on the object image relationship, it can be seen that the micro-lens array has two imaging surfaces, which indicates that the integrated imaging display system has two central depth planes. Correspondingly, the integrated imaging display system includes two depth-of-field ranges in the imaging space. Therefore, compared with the related art, the depth-of-field range of the imaging space is enlarged, and the 3D display image can be displayed in a large depth-of-field range, thereby enhancing the imaging performance of the integrated imaging display system.

Figure 2:
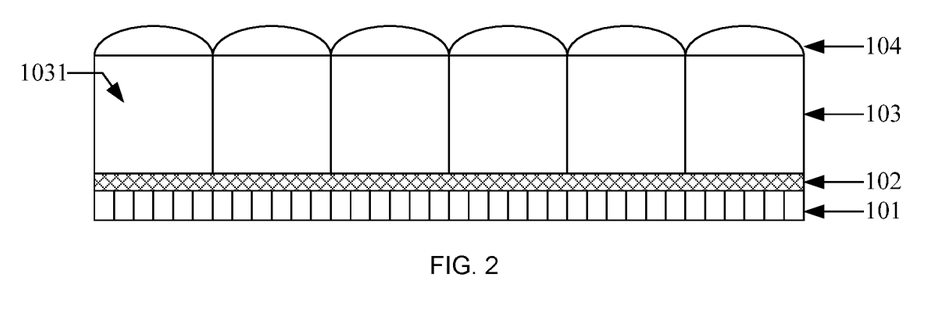
FIG. 2 is a schematic diagram of a structure of another integrated imaging display system according to an embodiment of the present disclosure.

Optionally, FIG. 2 is a schematic diagram of a structure of another integrated imaging display system according to an embodiment of the present disclosure. As shown in FIG. 2, the optical path folding element 103 includes a plurality of optical path folding units 1031 corresponding to the micro-lenses 1041 one by one, and an orthographic projection of the optical path folding unit 1031 on the light emitting surface of the display device 101 coincides with an orthographic projection of the corresponding micro-lens 1041 on the light emitting surface of the display device 101.

The optical path folding unit 1031 is configured to transmit the first linearly polarized light to the corresponding micro-lens 1041 according to the first transmission path and transmit the second linearly polarized light to the corresponding micro-lens 1041 according to the second transmission path.

It should be noted that the plurality of optical path folding units in the optical path folding element correspond to the plurality of micro-lenses in the micro-lens array one by one, and thereby the light incident to each micro-lens may be controlled by the optical path folding unit.

Figure 3:
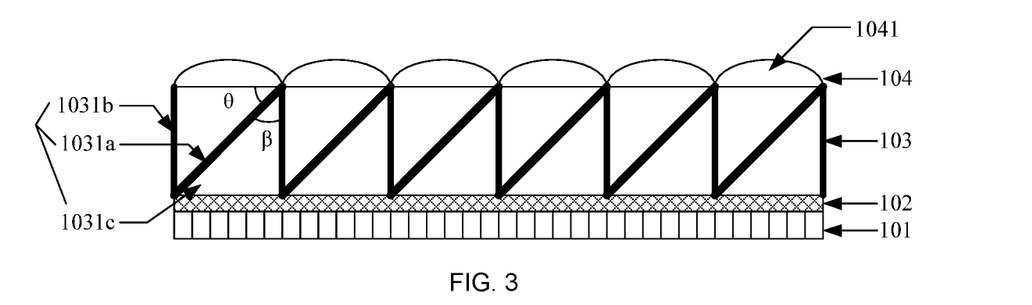
FIG. 3 is a schematic diagram of a structure of still another integrated imaging display system according to an embodiment of the present disclosure.

Optionally, FIG. 3 is a schematic diagram of a structure of still another integrated imaging display system according to an embodiment of the present disclosure. As shown in FIG. 3, each optical path folding unit 1031 includes a polarization light splitting element 1031a and two reflecting elements 1031b. Referring to FIG. 3, the two reflecting elements 1031b are oppositely disposed, and the polarization light splitting element is located between the two reflecting elements 1031b, with two ends of the polarization light splitting element 1031a respectively abutted against the two reflecting elements 1031b. An included angle θ between a light splitting surface of the polarization light splitting element 1031a and a light incident surface of the corresponding micro-lens 1041 is an acute angle, and an included angle β between the light splitting surface of the polarization light splitting element 1031a and a reflecting surface of each of the reflecting elements 1031b is an acute angle, the reflecting surface of each of the reflecting elements 1031b being intersected with a light emitting surface of the polarization converting element 102. The polarization light splitting element 1031a is configured to transmit light in the first polarization state and reflect light in the second polarization state. The reflecting element 1031b is configured to change a polarization state of incident light and reflect the light the polarization state of which is changed.

In the embodiment of the present disclosure, the optical path folding element may be composed of a plurality of independent optical path folding units arranged in a matrix array. Alternatively, the optical path folding element may be composed of a plurality of strip-shaped optical path folding units arranged in an array in a row direction or an array in a column direction. The strip-shaped optical path folding unit has a strip structure including a plurality of optical path folding units, and the orthographic projection of each strip-shaped optical path folding unit on the micro-lens array coincides with the region where a row or a column of micro-lenses are located.

Optionally, further referring to FIG. 3, each of the optical path folding units 1031 further includes a transparent rectangular parallelepiped structure 1031c, and an orthographic projection of the transparent rectangular parallelepiped structure 1031c on the micro-lens array 104 coincides with a region where one micro-lens 1041 is located. The two reflecting elements 1031b are reflecting layers disposed on two opposite surfaces of the transparent rectangular parallelepiped structure 1031c. One end of each of the reflecting layers close to the micro-lens 1041 is abutted against the light incident surface of the corresponding micro-lens 1041. The other end of each of the reflecting layers close to the polarization converting element 102 is abutted against the light emitting surface of the polarization converting element 102. The polarization light splitting element 1031a is a polarization light splitting film that is located on a diagonal surface of the transparent rectangular parallelepiped structure 1031c. One end of the polarization light splitting film is abutted against one end of one of the reflecting layers, and another end of the polarization light splitting film is abutted against one end of the other of the reflecting layers.

It should be noted that the two reflecting elements are reflecting layers disposed on two opposite planes of the transparent rectangular parallelepiped structure. That is, the two reflecting layers are disposed in parallel. Both of the two ends of each of the reflecting layers are abutted against the light incident surface of the micro-lens and the light emitting surface of the polarization converting element respectively, which can prevent the light transmitted in a certain optical path folding unit from entering the adjacent optical path folding unit. Furthermore, one end of the polarization light splitting film is abutted against one end of one of the reflecting layers, and another end of the polarization light splitting film is abutted against one end of the other of the reflecting layers, which can enable all the light entering the optical path folding unit to be incident on the polarization light splitting film, and thereby achieve effective light splitting through the polarization light splitting film.

Optionally, the transparent rectangular parallelepiped structure is composed of two triangular prism structures. A rectangular surface where the two triangular prism structures are in contact is provided with the polarization light splitting film. That is, the polarization light splitting film is located between the contact surfaces of two triangular prism structures. The transparent rectangular parallelepiped structure may be made of glass.

Optionally, the transparent rectangular parallelepiped structure is a transparent cubic structure, and the corresponding triangular prism structure is a right-angled triangular prism structure. The reflecting surface of each of the reflecting elements is perpendicular to the light emitting surface of the polarization converting element. That is, in the integrated imaging display system shown in FIG. 3, the reflecting surface of each reflecting element 1031b is perpendicular to the light emitting surface of the polarization converting element 102, and the included angle θ between the light splitting surface of the polarization light splitting element 1031a and the light incident surface of the corresponding micro-lens 1041 is 45°.

It should be noted that the reflecting surface of the reflecting element is perpendicular to the light emitting surface of the polarization converting element, and the angle between the light splitting surface of the polarization light splitting element and the light incident surface of the corresponding micro-lens is 45°, so that the incident direction and emitting direction of the first linearly polarized light in the optical path folding unit are the same, thereby ensuring the image display effect.

Exemplarily, the process of preparing the optical path folding unit provided in the embodiment of the present disclosure may include: providing two glass substrates; coating a polarization light splitting film on one side of one of the glass substrates; attaching the side of the glass substrate coated with the polarization light splitting film to another glass substrate fixedly; cutting the two glass substrates that are attached to obtain a rectangular parallelepiped structure composed of two glass substrates, between which the polarization light splitting film is on a diagonal surface of the rectangular parallelepiped structure; and forming a reflecting layer on two opposite surfaces of the rectangular parallelepiped structure to obtain an optical path folding unit, each of the two opposite surfaces having an angle of 45° with the polarization light splitting film.

Optionally, the transparent rectangular parallelepiped structure and the micro-lens are both made of glass, and the transparent rectangular parallelepiped structure in each of the optical path folding units is connected to the corresponding micro-lens by an optical cement.

Figure 4:
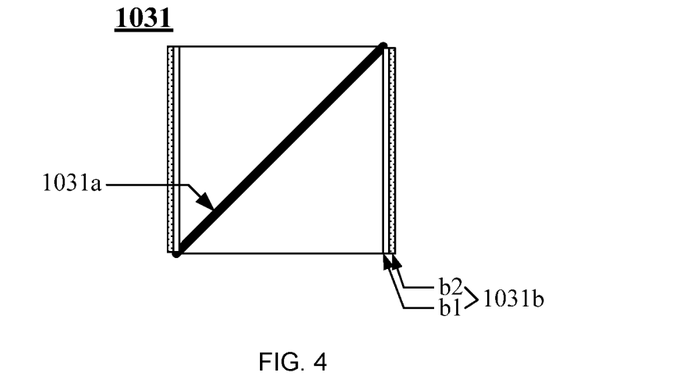
FIG. 4 is a schematic diagram of a structure of an optical path folding unit according to an embodiment of the present disclosure.

Optionally, FIG. 4 is a schematic diagram of a structure of an optical path folding unit according to an embodiment of the present disclosure. As shown in FIG. 4, the optical path folding unit 1031 includes a polarization light splitting element 1031a and two reflecting elements 1031b. The reflecting element 1031b includes a quarter-wave plate b1 and a reflecting film b2 that are stacked in a direction away from the polarization light splitting element 1031a.

It should be noted that the first linearly polarized light emitted from the polarization converting element may be reflected by the polarization light splitting element upon passing through the optical path folding unit, and then converted into the circularly polarized light after passing through the quarter-wave plate on one side end face. The circularly polarized light that is reflected by the reflecting element may pass through the quarter-wave plate again and is converted into the second linearly polarized light in the second polarization state. The second linearly polarized light is transmitted in the polarization light splitting element, passes through the quarter-wave plate on another side end face and thereby is converted into the circularly polarized light. Then, the circularly polarized light that is reflected by the reflecting film may pass through the quarter-wave plate again and is converted into the first linearly polarized light. The first linearly polarized light is reflected to the micro-lens by the polarization light splitting element.

Figure 5:
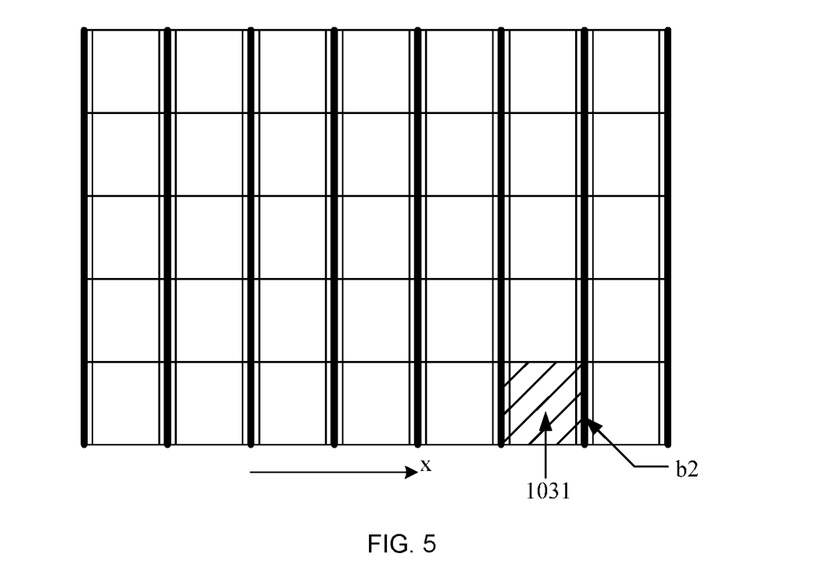
FIG. 5 is a top view of an optical path folding unit according to an embodiment of the present disclosure.

Optionally, FIG. 5 is a top view of an optical path folding unit according to an embodiment of the present disclosure. As shown in FIG. 5, the plurality of optical path folding units 1031 are arranged in an array along the first direction x, and two optical path folding units 1031 adjacent in the first direction x may share a double-sided reflecting film. Alternatively, the plurality of optical path folding units are arranged in an array along the first direction, and the reflecting films in two adjacent optical path folding units in the first direction are adjacent to each other. That is, each of the optical path folding units may be separately provided with two opposite reflecting films (that is, two adjacent optical path folding units do not share the reflecting film), which is not limited in the embodiments of the present disclosure.

Figure 6:
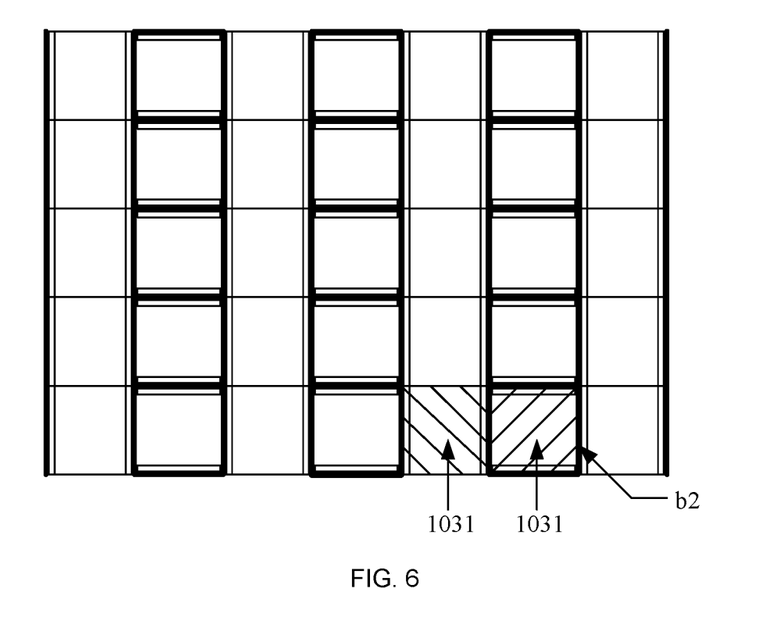
FIG. 6 is a top view of another optical path folding unit according to an embodiment of the present disclosure.

Optionally, FIG. 6 is a top view of another optical path folding unit according to an embodiment of the present disclosure. As shown in FIG. 6, the plurality of optical path folding units 1031 may be arranged in different directions. For example, the optical path folding units 1031 in the odd-numbered columns may be arranged in a direction perpendicular to the direction in which the optical path folding units 1031 in the even-numbered columns are arranged. The direction in which the optical path folding unit is arranged refers to the direction in which the reflecting films disposed oppositely in the optical path folding unit are arranged.

In the embodiment of the present disclosure, the first polarization state is an S polarization state, and the second polarization state is a P polarization state. That is, the first linearly polarized light is S-polarized light, the second linearly polarized light is P-polarized light, and the polarization light splitting element is configured to reflect the S-polarized light and transmit the P-polarized light. Alternatively, the first polarization state is P polarization state, and the second polarization state is S polarization state. That is, the first linearly polarized light is P-polarized light, the second linearly polarized light is S-polarized light, and the polarization light splitting element is configured to reflect the P-polarized light and transmit the S-polarized light.

Figure 7:
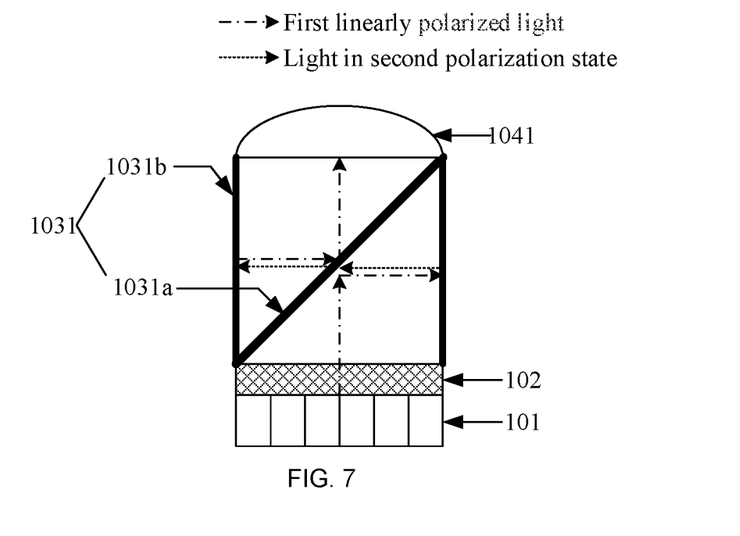
FIG. 7 is a schematic diagram of transmission of first linearly polarized light in an integrated imaging display system according to an embodiment of the present disclosure.

Exemplarily, if the first polarization state is the S polarization state and the second polarization state is the P polarization state, the polarization light splitting element is configured to reflect the S-polarized light and transmit the P-polarized light. FIG. 7 is a schematic diagram of transmission of first linearly polarized light in an integrated imaging display system according to an embodiment of the present disclosure. As shown in FIG. 7, when the light emitted from the display device 101 is converted by the polarization converting element 102 into the first linearly polarized light (S-polarized light), the first linearly polarized light is reflected by the polarization light splitting element 1031a to the reflecting element 1031b after being incident into the optical path folding unit 1031. The reflecting element 1031b converts the first linearly polarized light from the first polarization state to the second polarization state (converts the polarized light from the S polarization state to the P polarization state), and reflects the light in the second polarization state (the polarized light in the P polarization state). The light in the second polarization state is transmitted from the polarization light splitting element 1031a to another reflection element 1031b. The reflecting element 1031b converts the light from the second polarization state to the first polarization state (converts the polarized light from the P polarization state to the S polarization state) and thereby obtain and reflect the first linearly polarized light (polarized light in the S polarization state). The first linearly polarized light is reflected to the micro-lens 1041 by the polarization light splitting element 1031a.

Figure 8:
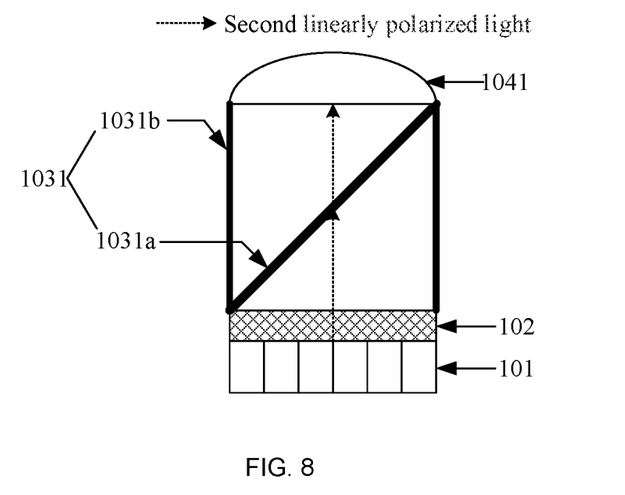
FIG. 8 is a schematic diagram of transmission of second linearly polarized light in an integrated imaging display system according to an embodiment of the present disclosure.

Further exemplarily, if the first polarization state is the S polarization state and the second polarization state is the P polarization state, the polarization light splitting element is configured to reflect the S-polarized light and transmit the P-polarized light. FIG. 8 is a schematic diagram of transmission of second linearly polarized light in an integrated imaging display system according to an embodiment of the present disclosure. As shown in FIG. 8, when the light emitted from the display device 101 is converted by the polarization converting element 102 into the second linearly polarized light (polarized light in the P polarization state), the second linearly polarized light is transmitted from the polarization light splitting element 1031a to the micro-lens 1041 after being incident into the optical path folding unit 1031.

Figure 9:
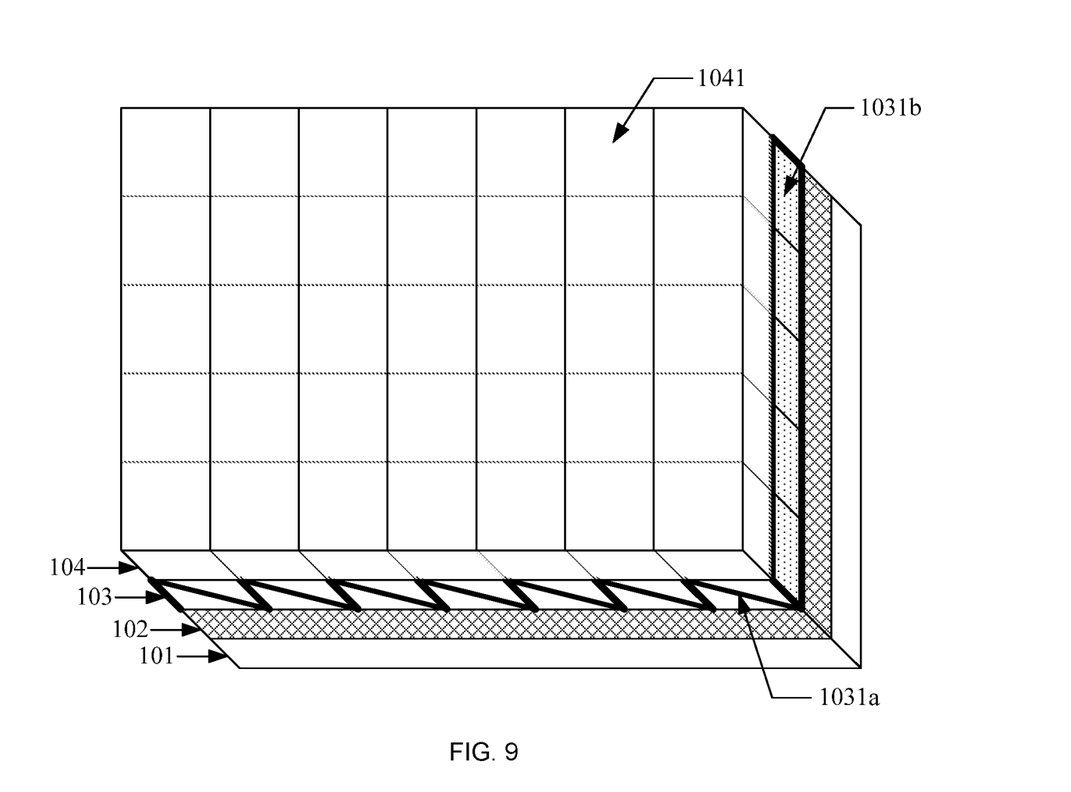
FIG. 9 is a perspective view of an integrated imaging display system according to an embodiment of the present disclosure.

Optionally, FIG. 9 is a perspective view of an integrated imaging display system according to an embodiment of the present disclosure. As shown in FIG. 9, all of the polarization converting element 102, the reflection element 1031b, and the polarization light splitting element 1031a have planar structures. The polarization converting element 102 may be a polarization converting film. The orthographic projection of the polarization converting film on the display device 101 covers the display region of the display device 101. One side of the polarization converting film is attached to the light emitting surface of the display device 101, and another side of the polarization converting film is attached to the light incident surface of the optical path folding unit 1031.

Figure 10:
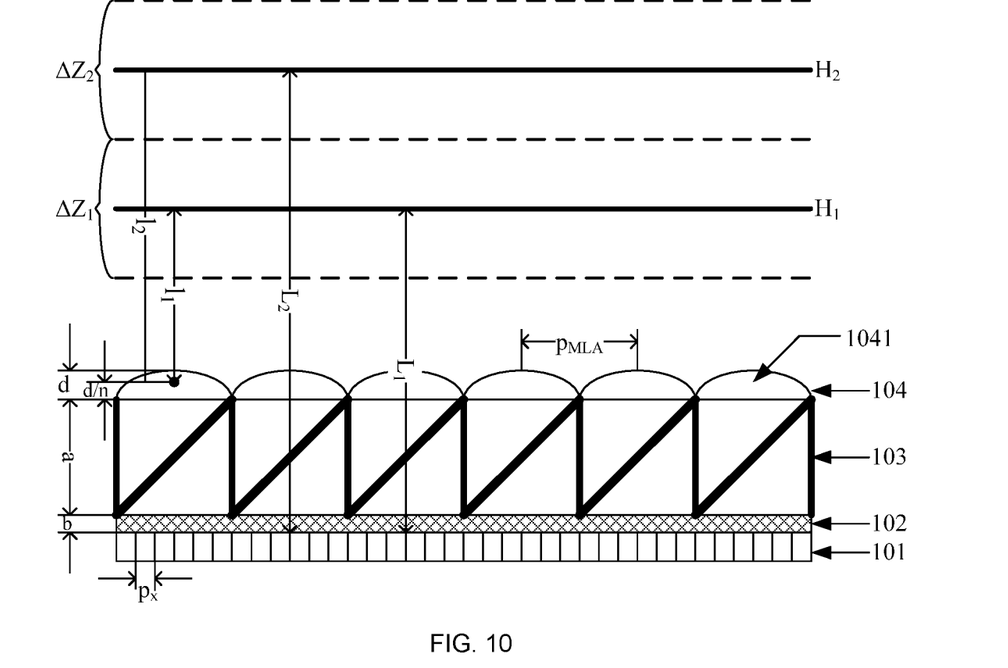
FIG. 10 is a schematic diagram of a system depth-of-field range of the integrated imaging display system shown in FIG. 3.

Exemplarily, FIG. 10 is a schematic diagram of a system depth-of-field range of the integrated imaging display system shown in FIG. 3. As shown in FIG. 10, in the optical path folding unit 103, the reflecting surface of the reflecting element is perpendicular to the light emitting surface of the polarization converting element 102, and the included angle between the light splitting surface of the polarization light splitting element and the light incident surface of the corresponding micro-lens 1041 is 45°. It is supposed that the thickness of the micro-lens 1041 is d, the thickness of the optical path folding element 103 (i.e. the thickness of the optical path folding unit) is a, the thickness of the polarization converting element 102 is b, both the refractive index of the micro-lens 1041 and the refractive index of the optical path folding element 103 are n, and the focal length of the micro-lens 1041 is f.

If the length of the transmission path of the first linearly polarized light in the optical path folding unit is equal to 3a and the length of the transmission path of the second linearly polarized light in the optical path folding unit is equal to a, the object distance $l_1'$ corresponding to the first linearly polarized light and the object distance $l_2'$ corresponding to the second linearly polarized light respectively satisfy the following formula:

$$l_1' = \frac{\frac{d}{n}+3a}{n}; l_2' = \frac{\frac{d}{n}+a}{n}.$$

The object distance and the image distance of the micro-lens satisfy the object-image relation formula:

$$\frac{1}{l}+\frac{1}{l'}=\frac{1}{f}.$$

Thus, the distance $l_1$ from the central depth plane $H_1$ of the first depth-of-field range $\Delta Z_1$ to the optical center of the micro-lens 1041 and the distance $l_2$ from the central depth plane $H_2$ of the second depth-of-field range $\Delta Z_2$ to the optical center of the micro-lens 1041 satisfy:

$$l_1 = \frac{f*l_1'}{f-l_1'}; l_2 = \frac{f*l_2'}{f-l_2'}.$$

Correspondingly, the first distance $L_1$ between the central depth plane $H_1$ of the first depth-of-field range $\Delta Z_1$ and the light emitting surface of the display device 101 satisfy: $L_1=l_1+d/n+a+b$; and the second distance $L_2$ between the central depth plane $H_2$ of the second depth-of-field range $\Delta Z_2$ and the light emitting surface of the display device 101 satisfy: $L_2=l_2+d/n+a+b$.

Furthermore, the range value $M_1$ of the first depth-of-field range $\Delta Z_1$ and the range value $M_2$ of the second depth-of-field range $\Delta Z_2$ may be calculated by the following formulas:

$$M_1=2l_1*(p_x/p_{MLA}); M_2=2l_2*(px/p_{MLA}).$$

Wherein, referring to FIG. 10, $p_x$ indicates the size of pixels in the display device 101, and $p_{MLA}$ indicates the distance between two adjacent micro-lenses in the micro-lens array 104. The range value of a certain depth-of-field range refers to the difference between the maximum value of the depth-of-field range and the minimum value of the depth-of-field range.

Optionally, there is no intersection between the first depth-of-field range and the second depth-of-field range, and the union of the first and second depth-of-field ranges is a continuous depth-of-field range. Alternatively, there may be an intersection between the first depth-of-field range and the second depth-of-field range, and the union of the first and second depth-of-field ranges is larger than any of the first and second depth-of-field ranges. In practical applications, the first depth-of-field range and the second depth-of-field range may be adjusted by adjusting parameters of the micro-lens, the size of pixels, and the size (e.g., width and height) of the optical path folding units, and details will not be repeated in the embodiment of the disclosure.

It should be noted that the system depth-of-field range of the integrated imaging display system provided by the embodiment of the disclosure is the union of the first and second depth-of-field ranges, and when there is no intersection between the first depth-of-field range and the second depth-of-field range, the range value of the system depth-of-field range is equal to the sum of $M_1$ and $M_2$. Hence, compared with the prior art, the depth-of-field range of the imaging space is enlarged.

Figure 11:
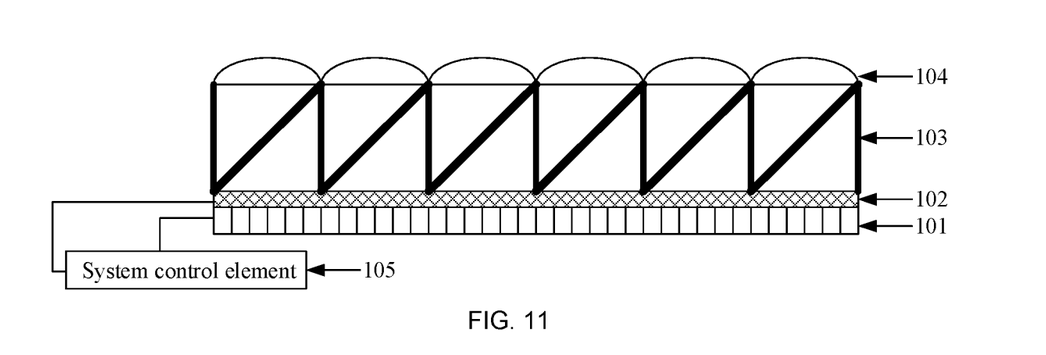
FIG. 11 is a schematic diagram of a structure of still yet another integrated imaging display system according to an embodiment of the present disclosure.

Optionally, FIG. 11 is a schematic diagram of a structure of further another integrated imaging display system according to an embodiment of the present disclosure. As shown in FIG. 11, the integrated imaging display system further includes a system control element 105 connected to the polarization converting element 102.

The system control element 105 is configured to control the polarization converting element 102 to convert the light emitted from the display device 101 into the first linearly polarized light during a first period of each display cycle, and control the polarization converting element 102 to convert the light emitted from the display device 101 into the second linearly polarized light during a second period of each display cycle. The duration of each display cycle is greater than or equal to the duration of a refresh cycle of the display device.

Optionally, the system control element may be a separate control chip in the display device, or may be integrated in a system on a chip (SoC) in the display device, which is not limited in the embodiment of the disclosure.

The refresh cycle of the display device is the reciprocal of the refresh rate of the display device. The first period and the second period may be consecutive periods. For example, the first period is the first half of the display cycle, and the second period is the second half of the display cycle. That is, the system control element controls the polarization converting element to convert the light emitted from the display device into the first linearly polarized light during the first half of each display cycle, and controls the polarization converting element to convert the light emitted from the display device into the second linearly polarized light during the second half of each display cycle. Alternatively, the first period is composed of a plurality of spaced first sub-periods, the second period is composed of a plurality of spaced second sub-periods, and the plurality of first sub-periods and the plurality of second sub-periods are alternated in time sequence. That is, in each display cycle, the system control element may control the polarization converting element to alternately convert the light emitted from the display device into the first linearly polarized light and the second linearly polarized light multiple times, which is not limited in the embodiment of the present disclosure.

Optionally, the display device provided by the embodiment of the present disclosure has a higher refresh rate. For example, the display device may have a refresh rate greater than the upper limit of the refresh rate recognizable to human eyes. The refresh rate herein refers to the number of times the display device refreshes images per second. The upper limit of the refresh rate recognizable to the human eyes is generally 30 times per second, whereas the display device refreshes at least one image in 1/30 seconds, which indicates that the duration of refresh cycle of the display device is less than 1/30 seconds.

Optionally, the duration of each display cycle is less than 1/30 second. By configuring the display cycle to be less than a minimum refresh time recognizable to human eyes, a first 3D display image may be displayed in the first depth-of-field range during the first period of the display cycle and a second 3D display image may be displayed in the second depth-of-field range during the second period of the display cycle. When the human eyes view the 3D display image from the side of the imaging space away from the display device, the human eyes may fail to perceive the alternate display of the first and the second 3D display images, which means that the human eyes may perceive the 3D display image formed by combining the first and second 3D display images, thereby achieving the formation of a 3D display image with a large depth of field in the imaging space. The first 3D display image and the second 3D display image in the embodiment of the disclosure may be respectively defined as a distant view 3D display image and a close view 3D display image according to the distance from the viewing position of human eyes. Since the central depth plane of the first depth-of-field range is relatively far away from the viewing position of human eyes, the first 3D display image formed in the first depth-of-field range may be defined as the distant view 3D display image. The second 3D display image formed in the second depth-of-field range may be defined as the close view 3D display image since the central depth plane of the second depth-of-field range is close to the viewing position of human eyes.

In a possible implementation, when the duration of each display is greater than the duration of the refresh cycle of the display device, the display device is configured to display the first image during the first period and display the second image during the second period, the depth of field of the first image being greater than the depth of field of the second image.

Regarding that the duration of the display is greater than the duration of the refresh cycle of the display device, it may indicate that the duration of the display cycle is equal to an even multiple of the duration of the refresh cycle of the display device. Each display cycle includes an even number of refresh cycles, so that the number of refresh cycles included in the first period equal to the number of refresh cycles included in the second period, thereby enabling the first period in each display cycle to have the same duration with the second period.

It should be noted that the first image and the second image may each be a small-depth image, and the depth of field of the first image may be greater than the depth of field of the second image. The small-depth image indicates that the depth range of the scene contained in the image is small, and the depth of field of the image refers to the depth of the scene in the image. The first image herein is used for forming the distant view 3D display image in the first depth-of-field range, and the second image is used for forming the close view 3D display image in the second depth-of-field range.

In another implementation, the display device is configured to display the third image in the display cycle. That is, the display device is configured to display the third image in both the first period and the second period.

It should be noted that the third image may be a large-depth image, which indicates that the depth range of the subject included in the image is large. For example, the large-depth image may include a subject image with a large depth (which may be referred to as a distant view image) and a subject image with a small depth (which may be referred to as a close view image). The integrated imaging display system may form the distant view 3D display image in the first depth-of-field range during the first period of the display cycle based on the distant view image in the third image, and may from the close view 3D display image in the second depth-of-field range during the second period of the display cycle based on the close view image in the third image.

Optionally, referring to FIG. 11, the display device 101 includes: a display panel (not shown separately) and image rendering elements (not shown separately) connected to the display panel and the system control element 105, respectively. The image rendering element is configured to render an image to be displayed under control of the system control element to generate image data, and transmit the image data to the display panel, and the display panel is configured to display an image based on the image data.

Optionally, the image rendering element may be a graphics processing unit (GPU).

Exemplarily, the embodiment of the present disclosure illustrates an imaging process of a 3D display image with a large depth of field in one display cycle by taking the integrated imaging display system shown in FIG. 11 as an example, where it is assumed that the first linearly polarized light is S linearly polarized light, and the second linearly polarized light is P linearly polarized light.

During the first period of the display cycle, the system control element controls the image rendering element to render the image to be displayed to generate image data corresponding to the distant view image, and transmits the image data corresponding to the distant view image to the display panel, and then the display panel displays the distant view image based on the image data corresponding to the distant view image. The system control element controls the polarization converting element to convert the light emitted from the display panel into S linearly polarized light. The S linearly polarized light may be reflected by the polarization light splitting element after passing through the optical path folding unit, and then may be converted into the circularly polarized light after passing through the quarter-wave plate on one side end face of the optical path folding unit. The circularly polarized light that is reflected by the reflecting element may pass through the quarter-wave plate again and is converted into the light in the P polarization state. The light in the P polarization state is transmitted from the polarization light splitting element, and then converted into the circularly polarized light after passing through the quarter-wave plate on another side end face of the optical path folding unit. The circularly polarized light that is reflected by the reflecting element may pass through the quarter-wave plate again and is converted into the S linearly polarized light. The S linearly polarized light that is reflected by the polarization light splitting element may pass through the micro-lens array and thereby form the distant view 3D display image in the first depth-of-field range.

During the second period of the display cycle, the system control element controls the image rendering element to render the image to be displayed to generate image data corresponding to the close view image, and transmits the image data corresponding to the close view image to the display panel; and then the display panel displays the close view image based on the image data corresponding to the close view image. The system control element controls the polarization converting element to convert the light emitted from the display panel into P linearly polarized light. After passing through the optical path folding unit, the P linearly polarized light may be reflected by the polarization light splitting element and then pass through the micro-lens array, thereby forming the close view 3D display image in the second depth-of-field range.

By forming the distant view 3D display image in the first depth-of-field range during the first period of the display cycle and forming the close view 3D display image in the second depth-of-field range during the second period of the display cycle, the imaging of the 3D display image with a large depth of field can be achieved.

In summary, in the integrated imaging display system according to the embodiment of the present disclosure, since the length of the first transmission path of the first linearly polarized light in the optical path folding element is longer than the length of the second transmission path of the second linearly polarized light in the optical path folding element, the distance from the image displayed on the display device to the optical center of the micro-lens when the image is transmitted by adopting the first linearly polarized light is greater than the distance from the image to the optical center of the micro-lens when the image is transmitted by adopting the second linearly polarized light, which indicates that there are two different object distances. Based on the object image relationship, it can be seen that the micro-lens array has two imaging surfaces, which indicates that the integrated imaging display system has two central depth planes. Correspondingly, the integrated imaging display system includes two depth-of-field ranges in the imaging space. Therefore, compared with the related art, the depth-of-field range of the imaging space is enlarged, and the 3D display image can be displayed in a large depth-of-field range, thereby enhancing the imaging performance of the integrated imaging display system.

Figure 12:
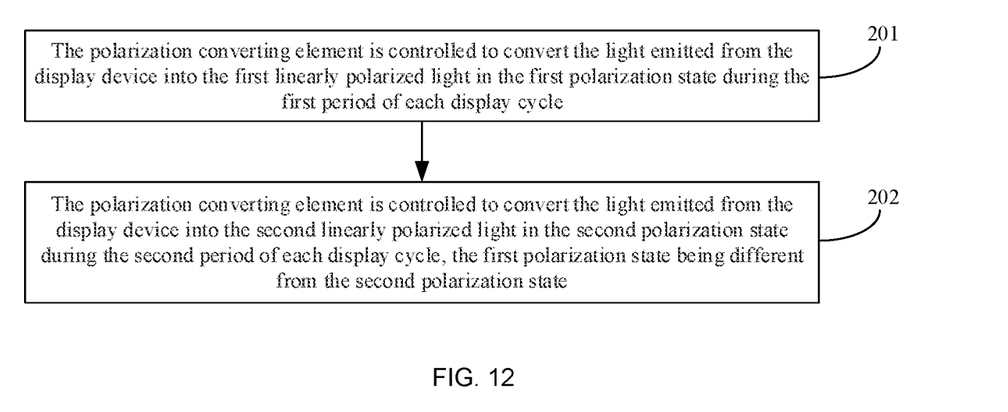
FIG. 12 is a flow chart of a control method for an integrated imaging display system according to an embodiment of the present disclosure.

FIG. 12 is a flow chart of a control method for an integrated imaging display system according to an embodiment of the present disclosure. The control method may be used for controlling the integrated imaging display system shown in any one of FIGS. 1 to 3, and the control method may be applied to the system control element in the integrated imaging display system shown in FIG. 11. As shown in FIG. 12, the method includes following steps.

In step 201, the polarization converting element is controlled to convert the light emitted from the display device into the first linearly polarized light in the first polarization state during the first period of each display cycle.

In step 202, the polarization converting element is controlled to convert the light emitted from the display device into the second linearly polarized light in the second polarization state during the second period of each display cycle, the first polarization state being different from the second polarization state.

The duration of each display cycle herein is greater than or equal to the duration of a refresh cycle of the display device.

Optionally, the first linearly polarized light and the second linearly polarized light may be one of S-linearly polarized light and P-linearly polarized light, respectively. The refresh cycle of the display device is the reciprocal of the refresh rate of the display device. The first period and the second period may be consecutive periods. For example, the first period is the first half of the display cycle, and the second period is the second half of the display cycle. That is, the system control element controls the polarization converting element to convert the light emitted from the display device into the first linearly polarized light during the first half of each display cycle, and controls the polarization converting element to convert the light emitted from the display device into the second linearly polarized light during the second half of each display cycle. Alternatively, the first period is composed of a plurality of spaced first sub-periods, the second period is composed of a plurality of spaced second sub-periods, and the plurality of first sub-periods and the plurality of second sub-periods are alternated in time sequence. That is, in each display cycle, the system control element may control the polarization converting element to alternately convert the light emitted from the display device into the first linearly polarized light and the second linearly polarized light multiple times, which is not limited in the embodiment of the present disclosure.

Optionally, the display device provided by the embodiment of the present disclosure has a relatively high refresh rate. For example, the display device may have a refresh rate greater than the upper limit of the refresh rate recognizable to human eyes. The refresh rate herein refers to the number of times the display device refreshes images per second. The upper limit of the refresh rate recognizable to the human eyes is generally 30 times per second, whereas the display device refreshes at least one image in 1/30 seconds.

Optionally, the duration of each display cycle is less than 1/30 second. By configuring the display cycle to be less than the refresh time recognizable to human eyes, a first 3D display image may be displayed in the first depth-of-field range during the first period of the display cycle and a second 3D display image may be displayed in the second depth-of-field range during the second period of the display cycle. When the human eyes view the 3D display image from the side of the imaging space far away from the display device, the human eyes may fail to perceive the alternate display of the first and the second 3D display images, which means that the human eyes may perceive the 3D display image formed by combining the first and second 3D display images, thereby achieving formation of a 3D display image with a large depth of field in the imaging space. The first 3D display image and the second 3D display image in the embodiment of the disclosure may be respectively defined as a distant view 3D display image and a close view 3D display image according to the distance from the viewing position of human eyes. Since the first depth-of-field range is far away from the viewing position of human eyes, the first 3D display image formed in the first depth-of-field range may be defined as the distant view 3D display image. While, the second 3D display image formed in the second depth-of-field range may be defined as the close view 3D display image since the second depth-of-field range is close to the viewing position of human eyes.

In a possible implementation, when the duration of each display cycle is greater than the duration of the refresh cycle of the display device, the control method for the integrated imaging display system further includes the following steps.

The display device is controlled to display the first image during the first period and display the second image during the second period, the first image having a greater depth of field than the second image.

Regarding that the duration of the display is greater than the duration of the refresh cycle of the display device, it may indicate that the duration of the display cycle is equal to an even multiple of the duration of the refresh cycle of the display device. Each display cycle includes an even number of refresh cycles, so that the number of refresh cycles included in the first period equal to the number of refresh cycles included in the second period, thereby enabling the first period in each display cycle to have the same duration with the second period.

It should be noted that the first image and the second image may each be a small-depth image, and the depth of field of the first image may be greater than the depth of field of the second image. The small-depth image indicates that the depth range of the scene contained in the image is small, and the depth of field of the image refers to the depth of the scene in the image. The first image herein is used for forming the distant view 3D display image in the first depth-of-field range, and the second image is used for forming the close view 3D display image in the second depth-of-field range.

In another possible implementation, the control method for the integrated imaging display system further includes the following step: controlling the display device to display the third image during the display cycle. That is, the display device is controlled to display the third image during the first period and the second period.

It should be noted that the third image may be a large-depth image, which indicates that the depth range of the subject included in the image is large. For example, the large-depth image may include a subject image with a large depth (which may be referred to as a distant view image) and a subject image with a small depth (which may be referred to as a close view image). The integrated imaging display system may form the distant view 3D display image in the first depth-of-field range during the first period of the display cycle based on the distant view image in the third image, and may from the close view 3D display image in the second depth-of-field range during the second period of the display cycle based on the close view image in the third image.

It should be noted that the sequence of steps of the control method for the integrated imaging display system according to the embodiment of the present disclosure may be appropriately adjusted, and the steps may also be correspondingly added or deleted according to the situation. Any method that can be easily conceived by any one skilled in the art within the technical scope disclosed in the present disclosure shall be contained within the protection scope of the present disclosure, and therefore will not be described again.

In summary, in the control method for the integrated imaging display system according to the embodiment of the present disclosure, the polarization converting element is controlled to convert the light emitted from the display device into the first linearly polarized light during the first period of each display cycle, and convert the light emitted from the display device into the second linearly polarized light during the second period of each display cycle. Since the length of the first transmission path of the first linearly polarized light in the optical path folding element is longer than the length of the second transmission path of the second linearly polarized light in the optical path folding element, the distance from the image displayed on the display device to the optical center of the micro-lens when the image is transmitted by adopting the first linearly polarized light is greater than the distance from the image to the optical center of the micro-lens when the image is transmitted by adopting the second linearly polarized light, which indicates that there are two different object distances. Based on the object image relationship, it can be seen that the micro-lens array has two imaging surfaces, which indicates that the integrated imaging display system has two central depth planes. Correspondingly, the integrated imaging display system includes two depth-of-field ranges in the imaging space. Therefore, compared with the related art, the depth-of-field range of the imaging space is enlarged, and the 3D display image can be displayed in a large depth-of-field range, thereby enhancing the imaging performance of the integrated imaging display system.

Regarding the integrated imaging display system involved in the aforesaid method embodiments, functions of each element or device have been described in detail in the structural embodiments, and will not be explained in detail here.

Figure 13:
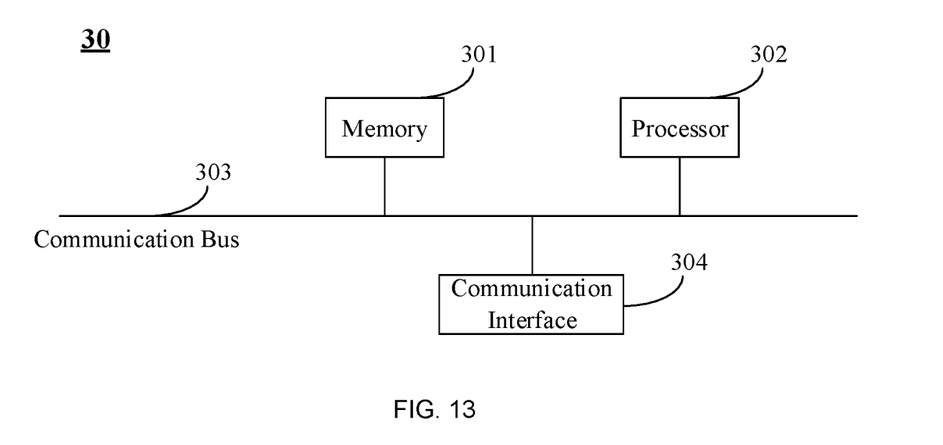
FIG. 13 is a block diagram of a system control unit according to an embodiment of the present disclosure

An embodiment of the present disclosure provides a system control element for controlling the integrated imaging display system shown in any one of FIGS. 1 to 3, FIG. 9 and FIG. 11. As shown in FIG. 13, the system control element 30 includes a memory 301 and a processor 302.

The memory 301 is configured to store a computer program.

The processor 302 is configured to execute a program stored on the memory 301 to implement the control method for the integrated imaging display system as shown in FIG. 12.

Optionally, the system control element 30 further includes a communication bus 303 and a communication interface 304.

The professor 302 herein includes one or more processing cores, and executes a plurality of functional applications and data processing by running computer programs and units.

The memory 301 is configured to store the computer programs and units. In particular, the memory may store an operation system, and an application unit required by at least one function. The operating system may be operating systems, such as real time executive (RTX), LINUX, UNIX, WINDOWS, or OS X.

There may be a plurality of communication interfaces 304, and the communication interface 304 is configured to communicate with other storage devices or network devices. For example, in the embodiment of the present disclosure, the communication interface 304 may be configured to transmit a control instruction to the display device and/or the polarization converting element.

The memory 301 and the communication interface 304 are connected to the processor 302 through communication lines 303, respectively.

The embodiment of the present disclosure provides a computer storage medium. When the program in the storage medium is executed by the processor, the control method for the integrated imaging display system as shown in FIG. 12 can be implemented.

Optionally, the computer storage medium may be a storage medium in the system control element (chip).

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. An integrated imaging display system, comprising: a display device, and a polarization converting element, an optical path folding element, and a micro-lens array which are on a light emitting side of the display device, the polarization converting element, the optical path folding element, and the micro-lens array being sequentially disposed in a direction away from the display device;
wherein the polarization converting element is configured to convert light emitted from the display device into first linearly polarized light in a first polarization state and second linearly polarized light in a second polarization state, the first polarization state being different from the second polarization state, the polarization converting element is a polarization converting film, and an orthographic projection of the polarization converting film on the display device covers a display region of the display device;
the micro-lens array comprises a plurality of micro-lenses, and the optical path folding element comprises a plurality of optical path folding units corresponding to the micro-lenses one by one, an orthographic projection of the optical path folding unit on a light emitting surface of the display panel coinciding with an orthographic projection of the corresponding micro-lens on the light emitting surface;
the optical path folding unit is configured to transmit the first linearly polarized light to the corresponding micro-lens according to a first transmission path, and transmit the second linearly polarized light to the corresponding micro-lens according to a second transmission path, the first transmission path having a greater length than the second transmission path;
the micro-lens array is configured to form a first three-dimensional display image in a first depth-of-field range based on the first linearly polarized light, and form a second three-dimensional display image in a second depth-of-field range based on the second linearly polarized light, wherein a first distance between a central depth plane of the first depth-of-field range and the light emitting surface of the display device is shorter than a second distance between a central depth plane of the second depth-of-field range and the light emitting surface of the display device; and
one side of the polarization converting film is attached to the light emitting surface of the display device, and another side of the polarization converting film is attached to a light incident surface of the optical path folding unit.

2. The integrated imaging display system according to claim 1, wherein each of the optical path folding units comprises a polarization light splitting element and two reflecting elements;
the two reflecting elements are oppositely disposed, and the polarization light splitting element is disposed between the two reflecting elements, two ends of the polarization light splitting element being respectively abutted against the two reflecting elements;
an included angle between a light splitting surface of the polarization light splitting element and a light incident surface of the corresponding micro-lens is an acute angle, and an included angle between the light splitting surface of the polarization light splitting element and a reflecting surface of each of the reflecting elements is an acute angle, the reflecting surface of each of the reflecting elements being intersected with a light emitting surface of the polarization converting element;
the polarization light splitting element is configured to transmit light in the first polarization state and reflect light in the second polarization state; and
the reflecting element is configured to change a polarization state of incident light and reflect the light the polarization state of which is changed.

3. The integrated imaging display system according to claim 2, wherein each of the optical path folding units further comprises a transparent rectangular parallelepiped structure, and an orthographic projection of the transparent rectangular parallelepiped structure on the micro-lens array coincides with a region where one micro-lens is located;
the two reflecting elements are two reflecting layers respectively disposed on two opposite surfaces of the transparent rectangular parallelepiped structure, one end of each of the reflecting layers close to the micro-lens being abutted against the light incident surface of the corresponding micro-lens, and another end of each of the reflecting layers close to the polarization converting element being abutted against the light emitting surface of the polarization converting element; and
the polarization light splitting element is a polarization light splitting film that is located on a diagonal surface of the transparent rectangular parallelepiped structure, one end of the polarization light splitting film being abutted against one end of one of the reflecting layers, and another end of the polarization light splitting film being abutted against one end of the other of the reflecting layers.

4. The integrated imaging display system according to claim 3, wherein the transparent rectangular parallelepiped structure is composed of two triangular prism structures, and a rectangular surface where the two triangular prism structures are in contact is provided with the polarization light splitting film.

5. The integrated imaging display system according to claim 4, wherein the transparent rectangular parallelepiped structure is a transparent cubic structure, and the triangular prism structure is a right-angled triangular prism structure; and the reflecting surface of each of the reflecting elements is perpendicular to the light emitting surface of the polarization converting element.

6. The integrated imaging display system according to claim 5, wherein the transparent rectangular parallelepiped structure and the plurality of micro-lenses are made of glass, and the transparent rectangular parallelepiped structure in each of the optical path folding units is connected to the corresponding micro-lens by an optical cement.

7. The integrated imaging display system according to claim 3, wherein each of the reflecting layers comprises a quarter-wave plate and a reflecting film that are stacked in a direction away from the polarization light splitting element.

8. The integrated imaging display system according to claim 7, wherein the plurality of optical path folding units are arranged in an array, and two optical path folding units adjacent in each row or each column of the array share one reflecting film, the reflecting film being a double-sided reflecting film.

9. The integrated imaging display system according to claim 7, wherein the plurality of optical path folding units are arranged in an array, and the reflecting films in two optical path folding units adjacent in each row or each column of the array are adjacent to each other.

10. The integrated imaging display system according to claim 1, further comprising a system control element connected to the polarization converting element;
the system control element is configured to control the polarization converting element to convert the light emitted from the display device into the first linearly polarized light during a first period of each display cycle, and control the polarization converting element to convert the light emitted from the display device into the second linearly polarized light during a second period of each display cycle, the first period and the second period of each display cycle being separated from each other;
wherein a duration of each display cycle is greater than or equal to a duration of a refresh cycle of the display device.

11. The integrated imaging display system according to claim 10, wherein the duration of each display cycle is greater than the duration of the refresh cycle of the display device; and
the display device is configured to display a first image during the first period and display a second image during the second period, the first image having a greater depth of field than the second image.

12. The integrated imaging display system according to claim 10, wherein the duration of each display cycle is less than 1/30 second.

13. The integrated imaging display system according to claim 12, wherein the display device comprises a display panel and an image rendering element respectively connected to the display panel and the system control element;
the image rendering element is configured to render an image to be displayed under control of the system control element to generate image data, and transmit the image data to the display panel; and
the display panel is configured to display the image based on the image data.

14. The integrated imaging display system according to claim 1, wherein the first polarization state is an S polarization state, the second polarization state is a P polarization state, and the polarization light splitting element is configured to reflect S-polarized light and transmit P-polarized light.

15. A system control element for controlling 9 an integrated imaging display system, the integrated imaging display system comprising:
a display device, and a polarization converting element, an optical path folding element, and a micro-lens array which are on a light emitting side of the display device, the polarization converting element, the optical path folding element, and the micro-lens array being sequentially disposed in a direction away from the display device,
wherein the polarization converting element is configured to convert light emitted from the display device into first linearly polarized light in a first polarization state and second linearly polarized light in a second polarization state, the first polarization state being different from the second polarization state, the polarization converting element is a polarization converting film, and an orthographic projection of the polarization converting film on the display device covers a display region of the display device;
the micro-lens array comprises a plurality of micro-lenses, and the optical path folding element comprises a plurality of optical path folding units corresponding to the micro-lenses one by one, an orthographic projection of the optical path folding unit on a light emitting surface of the display panel coinciding with an orthographic projection of the corresponding micro-lens on the light emitting surface;
the optical path folding unit is configured to transmit the first linearly polarized light to the corresponding micro-lens according to a first transmission path, and transmit the second linearly polarized light to the corresponding micro-lens according to a second transmission path, the first transmission path having a greater length than the second transmission path;
the micro-lens array is configured to form a first three-dimensional display image in a first depth-of-field range based on the first linearly polarized light, and form a second three-dimensional display image in a second depth-of-field range based on the second linearly polarized light, wherein a first distance between a central depth plane of the first depth-of-field range and the light emitting surface of the display device is shorter than a second distance between a central depth plane of the second depth-of-field range and the light emitting surface of the display device; and
one side of the polarization converting film is attached to the light emitting surface of the display device, and another side of the polarization converting film is attached to a light incident surface of the optical path folding unit, and
wherein the system control element comprises:
a memory; and
a processor;
wherein the memory is configured to store a computer program, and the processor is configured to execute a program stored on the memory to implement a control method, which comprises:
controlling the polarization converting element to convert the light emitted from the display device into the first linearly polarized light in the first polarization state during a first period of each display cycle, and
controlling the polarization converting element to convert the light emitted from the display device into the second linearly polarized light in the second polarization state during a second period of each display cycle;
wherein the first polarization state is different from the second polarization state, and a duration of each display cycle is greater than or equal to a duration of to a refresh cycle of the display device.

16. The system control element according to claim 15, wherein the duration of each display cycle is greater than the duration of the refresh cycle of the display device, and the method further comprises:

controlling the display device to display a first image during the first period; and controlling the display device to display a second image during the second period, the first image having a greater depth of field than the second image.

17. The system control element according to claim 15, the method further comprises:

controlling the display device to display a third image during the first period and the second period.

18. A non-transitory computer storage medium, storing a computer program, wherein the program is capable of being executed by a processor to implement a control method for an integrated imaging display system, and the integrated imaging display system comprises:

a display device, and a polarization converting element, an optical path folding element, and a micro-lens array which are on a light emitting side of the display device, the polarization converting element, the optical path folding element, and the micro-lens array being sequentially disposed in a direction away from the display device, wherein the polarization converting element is configured to convert light emitted from the display device into first linearly polarized light in a first polarization state and second linearly polarized light in a second polarization state, the first polarization state being different from the second polarization state, the polarization converting element is a polarization converting film, and an orthographic projection of the polarization converting film on the display device covers a display region of the display device;

the micro-lens array comprises a plurality of micro-lenses, and the optical path folding element comprises a plurality of optical path folding units corresponding to the micro-lenses one by one, an orthographic projection of the optical path folding unit on a light emitting surface of the display panel coinciding with an orthographic projection of the corresponding micro-lens on the light emitting surface;

the optical path folding unit is configured to transmit the first linearly polarized light to the corresponding micro-lens according to a first transmission path, and transmit the second linearly polarized light to the corresponding micro-lens according to a second transmission path, the first transmission path having a greater length than the second transmission path;

the micro-lens array is configured to form a first three-dimensional display image in a first depth-of-field range based on the first linearly polarized light, and form a second three-dimensional display image in a second depth-of-field range based on the second linearly polarized light, wherein a first distance between a central depth plane of the first depth-of-field range and the light emitting surface of the display device is shorter than a second distance between a central depth plane of the second depth-of-field range and the light emitting surface of the display device; and one side of the polarization converting film is attached to the light emitting surface of the display device, and another side of the polarization converting film is attached to a light incident surface of the optical path folding unit, and the method comprises:

controlling the polarization converting element to convert the light emitted from the display device into the first linearly polarized light in the first polarization state during a first period of each display cycle, and controlling the polarization converting element to convert the light emitted from the display device into the second linearly polarized light in the second polarization state during a second period of each display cycle;

wherein the first polarization state is different from the second polarization state, and a duration of each display cycle is greater than or equal to a duration of to a refresh cycle of the display device.

* * * * *